United States Patent
Sawyer et al.

(10) Patent No.: US 9,617,719 B2
(45) Date of Patent: Apr. 11, 2017

(54) INTEGRATED AIR CONDITIONING AND WATER-HARVESTING WITH DEMAND-DEPENDENT COOLING-LOAD REGULATION

(71) Applicant: Water Generating Systems I, LLC, Attleboro, MA (US)

(72) Inventors: George A Sawyer, Alexandria, VA (US); Ryan Larson, Iron Mountain, MI (US)

(73) Assignee: Water Generating Systems I, LLC, Arlington, VA (US)

( * ) Notice: Subject to any disclaimer, the term of this patent is extended or adjusted under 35 U.S.C. 154(b) by 0 days.

(21) Appl. No.: 15/042,223

(22) Filed: Feb. 12, 2016

(65) Prior Publication Data

US 2017/0051477 A1 Feb. 23, 2017

Related U.S. Application Data

(60) Provisional application No. 62/206,331, filed on Aug. 18, 2015, provisional application No. 62/212,632, filed on Sep. 1, 2015.

(51) Int. Cl.
*F25D 17/06* (2006.01)
*F25D 17/00* (2006.01)
(Continued)

(52) U.S. Cl.
CPC ............... *E03B 3/28* (2013.01); *F24F 3/06* (2013.01); *F24F 3/1405* (2013.01); *F24F 11/06* (2013.01)

(58) Field of Classification Search
CPC ............. F25B 5/02; F25B 2313/02333; F25B 2313/0212; F25B 2600/0252;
(Continued)

(56) References Cited

U.S. PATENT DOCUMENTS 5,007,245 A * 4/1991 Defenbaugh ............. F25B 5/02
62/117
6,182,453 B1 2/2001 Forsberg
(Continued)

OTHER PUBLICATIONS

International Search Report issed in connection with PCT Application No. PCT/US2016/012083 (directed to generally related subject matter).

(Continued)

*Primary Examiner* — Ryan J Walters
*Assistant Examiner* — Joseph Trpisovsky
(74) *Attorney, Agent, or Firm* — KMF Patent Services, PLLC; Kenneth M. Fagin, Esq.

(57) ABSTRACT

Integrated air conditioning and water-harvesting systems are disclosed. In these systems, one subsystem (air conditioning or water-harvesting) may be a primary subsystem and the other subsystem may be a secondary subsystem. As load on the overall system increases to the point the cooling demands for both subsystems cannot be met simultaneously, the system automatically reduces output of the secondary subsystem. In certain embodiments, an atmospheric water-harvester may be connected into the (potentially pre-existing) chilled-water system that provides cooling throughout a building, either via distributed fan-coil units or a centralized air-handling unit. Additionally, providing cooled-air exhaust from an atmospheric water-harvester to a building's cooling system allows substantial quantities of water to be produced at nominal incremental operating cost over a simple, straightforward air conditioning system.

13 Claims, 8 Drawing Sheets

(51) Int. Cl.
*F25B 5/00* (2006.01)
*F25D 21/00* (2006.01)
*F25B 7/00* (2006.01)
*F25B 41/00* (2006.01)
*E03B 3/28* (2006.01)
*F24F 3/06* (2006.01)
*F24F 3/14* (2006.01)
*F24F 11/06* (2006.01)

(58) Field of Classification Search
CPC .. F24F 3/1405; F24F 3/14; E03B 3/28; F25D 11/025; F25D 16/00
USPC .... 62/93, 333, 117, 150, 175, 203, 413, 427
See application file for complete search history.

(56) References Cited

U.S. PATENT DOCUMENTS

| | | | |
|---|---|---|---|
| 6,666,042 B1 * | 12/2003 | Cline | F24F 3/065 62/175 |
| 6,826,920 B2 | 12/2004 | Wacker | |
| 2002/0029580 A1 | 3/2002 | Faqih | |
| 2003/0159457 A1 | 8/2003 | Faqih | |
| 2004/0040322 A1 | 3/2004 | Engel et al. | |
| 2005/0039959 A1 * | 2/2005 | Fruhauf | B60H 1/00878 429/434 |
| 2005/0072171 A1 | 4/2005 | Jensen | |
| 2005/0229622 A1 | 10/2005 | Franck | |
| 2010/0107659 A1 * | 5/2010 | Hildreth, Jr. | F25B 5/02 62/77 |
| 2011/0048039 A1 | 3/2011 | Kohavi et al. | |
| 2012/0131933 A1 | 5/2012 | Kim | |
| 2012/0159972 A1 | 6/2012 | Haryanto | |
| 2012/0247135 A1 | 10/2012 | Fakieh | |
| 2015/0040591 A1 | 2/2015 | Lim et al. | |

OTHER PUBLICATIONS

Written Opinion issed in connection with PCT Application No. PCT/US2016/012083 (directed to generally related subject matter).
International Search Report issued in connection with corresponding PCT Application No. PCT/US16/47352, Dec. 2016.
Written Opinion issed in connection with corresponding PCT Application No. PCT/US16/47352, Dec. 2016.

* cited by examiner

INTEGRATED AIR CONDITIONING AND WATER-HARVESTING WITH DEMAND-DEPENDENT COOLING-LOAD REGULATION

FIELD OF THE INVENTION

In general, the disclosure relates to air conditioning and atmospheric water-harvesting systems. More particularly, the invention relates to an integrated system—particularly one in which a single coolant system services both an air conditioning subsystem and a water-harvesting subsystem.

BACKGROUND OF THE INVENTION

Air conditioning is a well-known technology. In general, air is passed across the cooling coil (e.g., an evaporator) of a refrigeration circuit, where it is cooled and dehumidified to a certain extent.

In some known air conditionings systems, after flash-evaporating to a gas in the evaporator and absorbing heat from the air flowing across the evaporator as it does so, refrigerant in the refrigeration circuit—i.e., a particular type of operating air-conditioning coolant—is compressed to high pressure (and high temperature) in a compressor and then condensed back to its liquid phase in a condenser. A heat-removing cooling medium (e.g. air or, in some systems, water or other liquid medium) flows past the condenser to cool the refrigerant. Heat that the refrigerant has absorbed from the air flowing across the evaporator (as well as heat that has been imparted to the refrigerant due to compression, compressor motor cooling, and/or inadvertent absorption by the gas between evaporator and compressor suction) is transferred to the heat-removing cooling medium and "disposed" of, e.g., by venting the cooling medium to an outside environment, thereby allowing the refrigerant to continue cycling.

In other known air conditioning systems, which frequently are used, for example, in large commercial or multi-unit residential buildings, chilled water is used as the operating air-conditioning coolant instead of liquid/gas refrigerant. In such systems, an industrial chiller is provided (e.g., on the roof of the building) to chill water to temperatures on the order of 40° F. (A refrigeration system like that described above, which uses a gas/liquid refrigerant, compressor, and condenser, may be used within the chiller to chill the water coolant.) The chilled water circulates throughout the building through a system of conduits, which carry the chilled water to various circulatory branches throughout the building. For example, each branch could be an individual room, office suite, or residential apartment within the building. The chilled water flows through a cooling coil or evaporator within a fan-coil unit that is part of each circulatory branch, and air to be cooled (e.g., for human comfort or other cooling purposes) is blown across the cooling coil. The water, which has absorbed heat from the air blown across the cooling coil and become warmer, is cycled back to the chiller to be cooled once more.

On the other hand, atmospheric water-harvesting—that is, extracting moisture from the ambient atmosphere in sufficient quantities to provide for human/animal consumption and/or other, technical water and/or graywater-suitable purposes—is a somewhat less common endeavor than air conditioning, although there is, in fact, an established atmospheric water-harvesting industry. Although atmospheric water-harvesting uses a cooling process that is, conceptually speaking, generally the same as or similar to the cooling process used for air conditioning, the operational points in terms of how much the ambient air needs to be cooled and how much air needs to be processed are relatively different as compared to the corresponding operational points for general air conditioning. As a result, air conditioning systems and atmospheric water-harvesting systems have historically been viewed as separate, independent systems and have been developed as such.

SUMMARY

The present disclosure features a more-unified, integrated system that provides for both air conditioning and atmospheric water-harvesting. In general, a system according to this disclosure has a single coolant-supply system (e.g., refrigerant-based or chilled-water-based) that serves both an air conditioning subsystem, i.e., a system that is configured to operate at design points suitable for air conditioning, and an atmospheric water-harvesting subsystem, i.e., a system that is configured to operate at design points suitable for atmospheric water-harvesting. Such a system has lower capital costs, operational costs, and space requirements than would be the case if separate air conditioning and water-harvesting systems were to be installed and utilized. It can also substantially reduce power-consumption and, in certain embodiments, can be easily implemented as a retrofit using preexisting air conditioning systems.

In one aspect, the inventive concept entails one of the two subsystems being a primary subsystem, with the other subsystem being secondary and having its functionality throttled back by decreasing the cooling load associated with the secondary system as cooling demand associated with the primary subsystem increases. In one embodiment, for example, air conditioning may be the primary requirement. If cooling demand placed on the overall system increases to a point that maximal air conditioning and water-harvesting outputs cannot be maintained simultaneously, the system responds by throttling back the water-harvesting output of the water-harvesting subsystem so that the water-harvesting subsystem places less of a cooling demand on the coolant system (refrigerant or chilled water). The system may do this, for example, by reducing the speed of a variable-speed fan, which drives air across the water-harvesting system's evaporator, to reduce the rate of airflow through the water-harvesting subsystem.

Depending on location of the system, which subsystem is primary and which subsystem is secondary may be reversed. For example, in less-developed regions of the world and/or in disaster areas, water-production may be far more important than air conditioning. In that case, the water-harvesting function of the overall system would be primary, and air-conditioning output of the system would be throttled back as cooling demand of the water-harvesting subsystem increases, e.g., with rising ambient temperatures and/or decreasing relative humidity. In a particularly advantageous embodiment, the various system sensors used to regulate performance, described below, could be replicated as between the two separate subsystems, and which of the two subsystems is primary and which is secondary could be toggled back and forth at the user's discretion.

In another aspect, the invention features a method for reducing water-consumption associated with a preexisting building having a preexisting air conditioning system. In this regard, the invention entails connecting a water-harvesting unit into the building's preexisting coolant-supply system and using the building's preexisting coolant supply to provide operating coolant for the water-harvesting unit. Typically (although not necessarily), water-harvesting would be secondary to air conditioning and would be pursued more vigorously or aggressively when air conditioning demands are lower, e.g., from dusk to dawn, but by extracting and saving moisture from the atmosphere, which can be used at least for graywater-suitable purposes, the overall demand for water associated with the building can be reduced significantly. Although this benefit would be advantageous anywhere, it is deemed to be particularly advantageous in places where growing populations and/or shrinking resources—e.g., California, where mandatory water restrictions were implemented for the first time ever in 2015—have created crisis situations.

According to yet another aspect of the invention, energy expended cooling air to produce enough water for human/animal consumption and/or other, graywater-suitable purposes is not simply "discarded" after the water-harvesting process. Rather, an integrated air conditioning/water-harvesting system according to this aspect of the invention is configured such that at least a portion of the chilled air exhausted by an atmospheric water-harvester subsystem is utilized in connection with a building's air conditioning or air handling subsystem. Thus, in one embodiment according to this aspect of the invention, atmospheric water-harvester exhaust air is supplied to a mixing plenum located upstream of a cooling coil that is used to chill air, which is subsequently provided throughout a building for cooling purposes. The atmospheric water-harvester exhaust air is mixed in the plenum with fresh, unconditioned air and/or return air from the building. In another embodiment, atmospheric water-harvester exhaust air is supplied to the air conditioning system just downstream of the air conditioning system, i.e., at a location upstream of the point where air conditioning air enters dwelling spaces within the building. And in a functionally equivalent configuration, atmospheric water-harvester exhaust air is supplied to one of the building's return-air conduits instead of to the mixing plenum.

BRIEF DESCRIPTION OF THE DRAWINGS

These and other features will become clearer in view of the following disclosure, in which.

DETAILED DESCRIPTION

Figure 1:
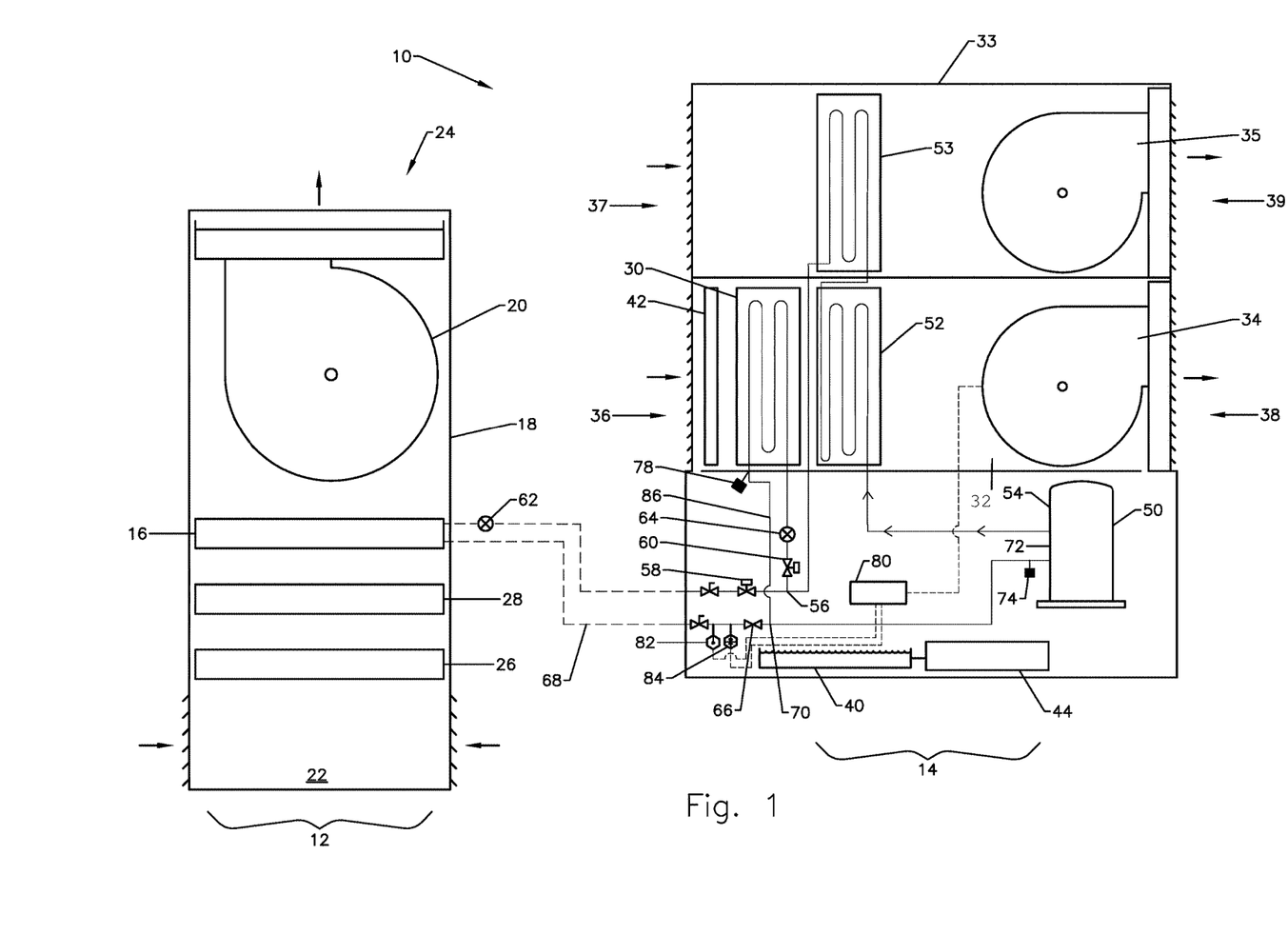
FIG. 1 is a schematic, overall system diagram of one embodiment of an integrated air conditioning/water-harvesting system in accordance with the invention.

One embodiment 10 of an integrated air conditioning and water-harvesting system in accordance with the inventive concept is illustrated in FIG. 1. This embodiment 10 is configured for air conditioning to be the primary requirement. The system includes an air conditioning subsystem 12 (e.g., a residential or other-sized air conditioning system) and an atmospheric water-harvesting subsystem 14. In a generally conventional manner, the air conditioning subsystem 12 includes an evaporator 16 that is located within a duct 18 and a vent fan or other air-moving mechanism 20 that causes air to flow through the duct 18, from inlet end 22 to outlet end 24, and across the evaporator 16, which cools the air flowing across it. Air exiting the duct 18 is provided to a space in which cooled, conditioned air is required, e.g., for the comfort of human or other animal occupants or, perhaps, for keeping electrical components from overheating. Suitably, the air conditioning subsystem 12 includes an air filter 26, to remove undesirable air-borne particles such as dust, mold, allergens, etc., as well as a condensate pan 28 to collect atmospheric moisture that may have condensed on and dripped off of the evaporator 16.

Similarly, in the specifically illustrated embodiment 10, the atmospheric water-harvesting subsystem 14 includes an evaporator 30 that is located within a duct 32 and a vent fan or other air-moving mechanism 34 that causes air to flow through the duct 32, from inlet end 36 to outlet end 38, and across the evaporator 30. As air flows across the evaporator 30, it cools substantially; as it does so, it becomes oversaturated with moisture, and moisture contained within the air will condense on the evaporator 30. In the illustrated embodiment, the vent fan 34 is a variable-speed device, which allows the amount of water-harvesting, and hence cooling demand placed on the refrigerant system by the water-harvesting subsystem, to be regulated by varying the rate (in terms of volumetric or mass flow rate) of air flowing through the duct 32. In other words, reducing the flow-rate of air through the water-harvesting subsystem reduces the rate at which refrigerant evaporates within the evaporator 30 (by reducing the amount of air transferring heat to the refrigerant, thereby leaving more refrigerant in its liquid phase to evaporate within the evaporator 16 in the air conditioning subsystem 12 for air conditioning purposes.

In more-advanced configurations (not illustrated), the ducting arrangement of the atmospheric water-harvesting subsystem 12 could be configured as per the atmospheric water-harvesters disclosed in U.S. Pat. Nos. 7,954,335 and 8,627,673, the contents of both of which are incorporated by reference. According to those two patents, incoming air is precooled to varying degrees before it passes over the evaporator, with the amount of precooling that is provided varying inversely with ambient relative humidity levels since it is easier to extract moisture from air that is heavily laden with moisture such that precooling—with the operational costs or inefficiencies associated with it—becomes less important or beneficial.

In an alternate embodiment described further below, at least some of the cooled/chilled air downstream of the evaporator 30 (i.e., atmospheric water-harvester exhaust air) could be ported so as to combine with the cooled-air output from the air conditioning subsystem 12, thereby helping to cool the room or other environment that is being served by the air conditioning subsystem 12. Doing so would alleviate some of the cooling load being carried by the evaporator 16.

According to yet another alternate embodiment that is described further below, at least some of the cooled/chilled air downstream of the water-harvester evaporator 30 could be routed to the return air portion of the air conditioning subsystem 12, where it would help provide the required fresh air requirements for that subsystem. While ducting some of the cooled/chilled air coming off of the water-harvesting evaporator 30 into the room being air-conditioned, as referred to above, contributes to overall "carrying capacity" of the air conditioning subsystem 12, "dumping" it into the return allows it to mix with room air and be distributed evenly through the existing air conditioning duct system.

As further illustrated in FIG. 1, the atmospheric water-harvesting subsystem 14 includes a condensate pan or other water-collecting device 40 to collect atmospheric moisture that will have condensed on and dripped off of the evaporator 30 and, suitably, an air filter 42 to remove undesirable air-borne particles such as dust, mold, allergens, etc. from the incoming moisture-supplying airstream, which particles could otherwise foul the evaporator and the product water. Water collected by the water-collecting device 40 is treated downstream in a water-purification system 44, which may include UV-sterilization, ozone injection, bacteriostatic treatment, re-mineralization, chlorination, fluoride treatment, etc., to make the product water suitable and/or more desirable for human consumption or other technical application.

Furthermore, condensate that collects in condensate pan 28 in the air conditioning subsystem may be added to the water that is collected in the water-collecting device 40 to augment the overall water-production output of the system 10. Depending on the relative arrangement of the subsystems 12 and 14, the condensate could be transferred from condensate pan 28 to the water-collecting device 40 simply via gravity-feed or via a water pump and conduit (not illustrated).

With respect to further refrigeration-related components, the system 10 includes a variable-speed compressor 50 and a primary condenser 52. Suitably, the primary condenser 52 is located within the water-harvesting subsystem duct 32 so that air that has been cooled via the evaporator 30 to yield moisture will cool the condenser 52 and, hence, the refrigerant contained within it. (Depending on system configuration and/or ambient conditions, combining a portion of the air that has been cooled by the refrigerant-based evaporator 30 with the cooled-air output from the air conditioning subsystem 12, as alluded to above, may—but not necessarily will—reduce the condenser-cooling capability of the airflow through the water-harvesting subsystem to such an extent that so "shunting" the cooled air becomes undesirable.) Because the air will be heated significantly by the condenser 52, it is exhausted to an outside location instead of to an interior environment.

Additionally, a secondary condenser 53 is provided within a secondary cooling duct 33, which extends from secondary air inlet 37 to secondary outlet 39. Secondary fan 35 drives air through the secondary cooling duct 33 to cool and thereby condense still-hot, still-high-pressure refrigerant within the secondary condenser 53 by carrying heat away from it. Suitably, the secondary cooling fan 35 is also a variable-speed device. Notably, the secondary condenser 53 allows refrigerant in the overall system to continue being cooled and condensed even when air-flow through the duct 32 is throttled back to reduce water-harvesting and cooling demand placed on the water-harvesting evaporator 30, as air conditioning requirements increase. Thus, having the secondary cooling fan 35 as a variable-speed device lets the secondary-condenser-cooling function of the secondary cooling fan 35 be phased in gradually as the primary-condenser-cooling airflow through the duct 32 decreases.

As illustrated schematically, refrigerant flows from the high-pressure discharge side 54 of the compressor 50 to the primary condenser 52 and the secondary condenser 53 and then, from the secondary condenser's discharge, to a node or junction point 56. From the junction point 56, liquid-phase refrigerant is able to flow to both the air conditioning evaporator 16 and the water-harvesting evaporator 30. On/off (i.e., binary) solenoid valves 58 and 60 are provided to permit or prevent refrigerant from flowing to the evaporators 16 and 30, respectively.

Furthermore, an expansion valve 62 is located just upstream of the air conditioning evaporator 16, and an evaporator pressure regulator 66 is provided in the refrigerant return line 68 downstream of the air conditioning evaporator 16. Together, the pressure regulator 66 and the expansion valve 62 provide fairly close or precise regulation or control over the degree of cooling provided by the air conditioning evaporator 16; this is desirable because over-cooling of the air-conditioned air can make it too cold and/or too dry for people within the air-conditioned space to be comfortable.

Similarly, an expansion valve 64 is located just upstream of the water-harvesting evaporator 30. However, in contrast to the air conditioning subsystem 12, no evaporator pressure regulator is provided in the disclosed embodiment to assist in regulating the behavior of refrigerant within the water-harvesting evaporator 30. This is because significantly more cooling of the air is required in order to obtain meaningful amounts of useable water (i.e., enough water to make operation of the water-harvesting subsystem 14 worthwhile for hydration and/or other purposes); therefore, the water-harvesting evaporator can be operated "wide-open" to achieve maximum possible cooling of the air that flows over it.

Finally (in terms of the overall refrigeration cycle of the system 10), gaseous refrigerant from the air conditioning evaporator 16 combines with gaseous refrigerant from the water-harvesting evaporator 30 at junction or node-point 70. From there, the refrigerant returns to the suction side 72 of the compressor 50 to begin the refrigerant cycle once again.

As further shown in FIG. 1, the overall system 10 includes a control module 80, which is configured (i.e., includes a microprocessor and computer code that runs thereon) to control operation of the system 10 with one of the two subsystems 12, 14 being a primary subsystem and the other of the two subsystems being a secondary subsystem. Thus, for example, the system 10 as illustrated in FIG. 1 is configured—i.e., has structure as well as appropriately designed computer code that runs on the control module's microprocessor and/or other electronic control elements—with the air conditioning subsystem 12 as the primary subsystem and the water-harvesting subsystem 14 as the secondary subsystem.

In general, at partial loads (i.e., during evenings, nights, mornings, cooler days, etc.) the air conditioning evaporator 16 operates based upon its own need for refrigerant, with the water-harvesting fan 34 operating at maximum speed for maximum water production. As ambient temperatures rise, however, and the need for air conditioning increases (i.e., the cooling load on the air conditioning evaporator 16 increases), the air conditioning evaporator 16 will start to become "starved" for refrigerant because there is not enough refrigeration capacity for both the air conditioning subsystem 12 and the water-harvesting subsystem 14 to run "at full speed." At this point, the superheat of the refrigerant coming off of the air conditioning evaporator 16 will increase with increasing refrigerant starvation.

Therefore, the control module 80 monitors the value of superheat until it passes a predetermined threshold, after which the control module will begin to reduce the speed of the water-harvesting fan 34. As the water-harvesting fan speed decreases, so, too, does the cooling load placed on the water-harvesting evaporator 30 and, consequently, the amount of refrigerant required for that circuit. With less refrigeration capacity being consumed by the water-harvesting subsystem 12, the air conditioning evaporator 16 will begin to increase capacity and return to an acceptable level of superheat. Suitably, the system uses a tunable PID loop (not illustrated) to control the water-harvesting fan 34, slowly reducing the fan speed to achieve a design superheat upper threshold.

Figure 2:
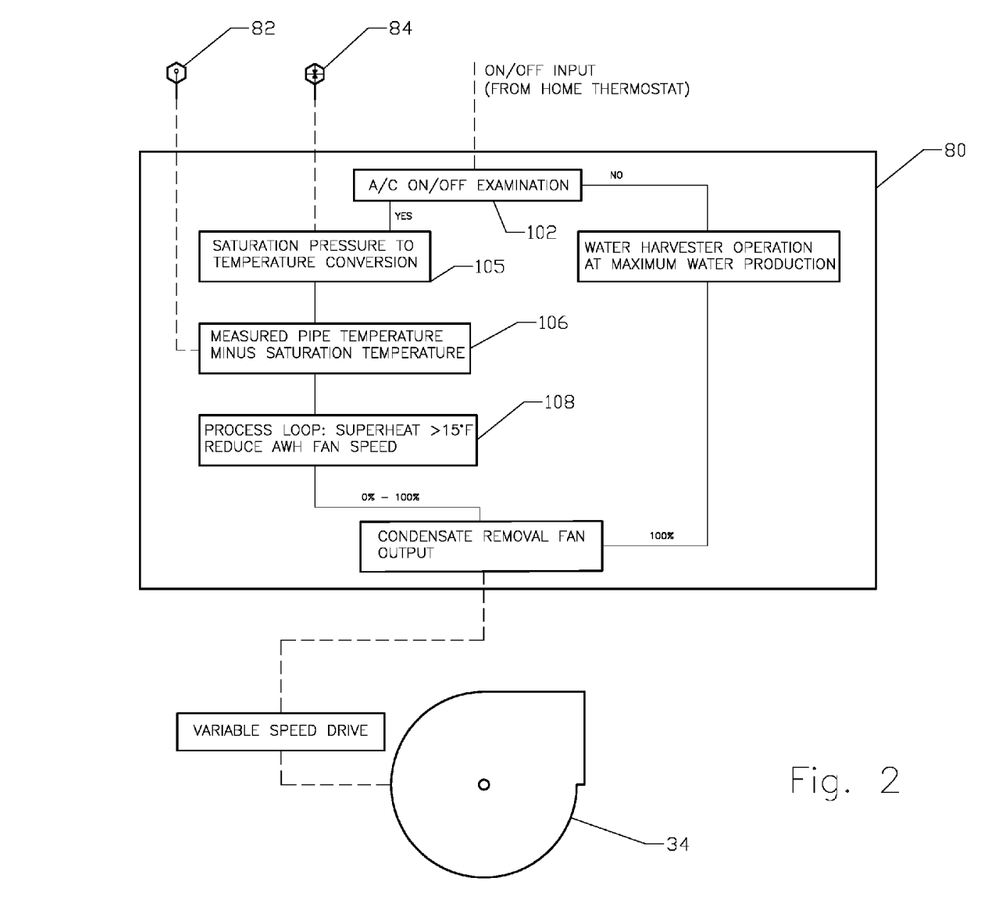
FIG. 2 is a schematic, overall control diagram for the system shown in FIG. 1.

To implement such priority of the air conditioning subsystem 12, the system 10 includes a temperature sensor 82 and a pressure sensor 84 in the refrigerant return line 68, which sensors measure temperature and pressure of refrigerant returning from the air conditioning evaporator 16 in order to determine the superheat thereof. Signals from the temperature sensor 82 and the pressure sensor 84 are provided to the control module 80, which uses them to determine the superheat and regulate the speed of the water-harvesting fan 34 accordingly. Thus, as illustrated in FIG. 2, if no air conditioning is being used (decision 102 is "no"), the water-harvesting subsystem 14 will run at maximum capacity (step 104), with the water-harvesting fan 34 running at full speed.

On the other hand, if air conditioning is, in fact, being used (decision 102 is "yes"), the controller will calculate superheat by determining saturation temperature based on the measured pressure (step 104) and subtracting the so-determined saturation temperature from the measured temperature (step 106) to yield the superheat value. This process is implemented in an ongoing cycle (indicated schematically as step 108). If the value of superheat reaches/exceeds a predetermined threshold value (e.g., 15° F.), the controller 80 will begin to throttle back the speed, and hence the air-mass/volumetric output, of the water-harvesting fan 34.

If demand on the air conditioning system increases beyond ordinarily expected design conditions, it is theoretically possible that the water-harvesting fan 34 could eventually be stopped altogether so as to terminate completely water-harvesting operation of the overall system 10. Furthermore, the specific value of the superheat threshold may vary depending on factors such as design operating points (in terms of ambient environment); bare-minimum water-output requirements, if any; particular refrigerant being used; etc.

As further illustrated in FIG. 1, a suction pressure sensor 74 may be provided at, or just upstream of, the suction side 72 of the compressor 50 to monitor system performance. Additionally, pressure and temperature sensors 78 measure refrigerant pressure and temperature at the outlet of the water-harvesting evaporator 30, and these two values may be used to regulate/control refrigerant flow through the evaporator 30 with a fairly high degree of precision as noted above.

By way of quantifying the configurations of the air conditioning and water-harvesting subsystems in term of their different operating points, the suction temperature for the air conditioning subsystem 12—i.e., the temperature of the refrigerant in the air conditioning evaporator 16 at its saturation point—will be approximately 50° F. to 60° F., while the suction temperature for the water-harvesting subsystem will be closer to approximately 32° F. to 40° F.; these temperatures dictate or determine the respective evaporator surface temperatures, which will be similar to the refrigerant temperatures. Thus, with the overall system running optimally, the respective expansion valves will be set/configured to throttle to maintain these temperature rises from saturation temperature to the outlet of each respective evaporator, and relative cooling capability of each of the evaporators 16 and 30 will be regulated by way of airflow through the secondary system as explained above. (As for refrigerant pressures within the evaporators, on the other hand, exact values will vary depending on the specific refrigerant that is used.)

According to another embodiment (not illustrated) in accordance with the inventive principles of this disclosure, it may be the case, as noted above, that water-harvesting is deemed to be more important than air conditioning. In that case, the air conditioning fan 20 will be a variable-output device, and the superheat of refrigerant leaving the water-harvesting evaporator 30 will be determined using temperature and pressure sensors (not illustrated) in the refrigerant return line 86 on the downstream side of water-harvesting evaporator 30. The speed/output of air conditioning fan 20 would then be throttled back as the superheat of the refrigerant leaving the water-harvesting evaporator 30 reaches and exceeds a predetermined value in generally the same manner as described above.

Further still, for maximum utility, a system (not illustrated) could be constructed with pressure and temperature sensors in the refrigerant return lines from both the air conditioning evaporator 16 and the water-harvesting evaporator 30 so as to measure the refrigerant superheat in either line. The control module 80 could then be switched between two different modes depending on user preference, where one of the air conditioning and water-harvesting subsystems is the primary subsystem in one of the two modes and the other of the air conditionings and water-harvesting subsystems is the primary subsystem in the other of the two modes.

Figure 3A:
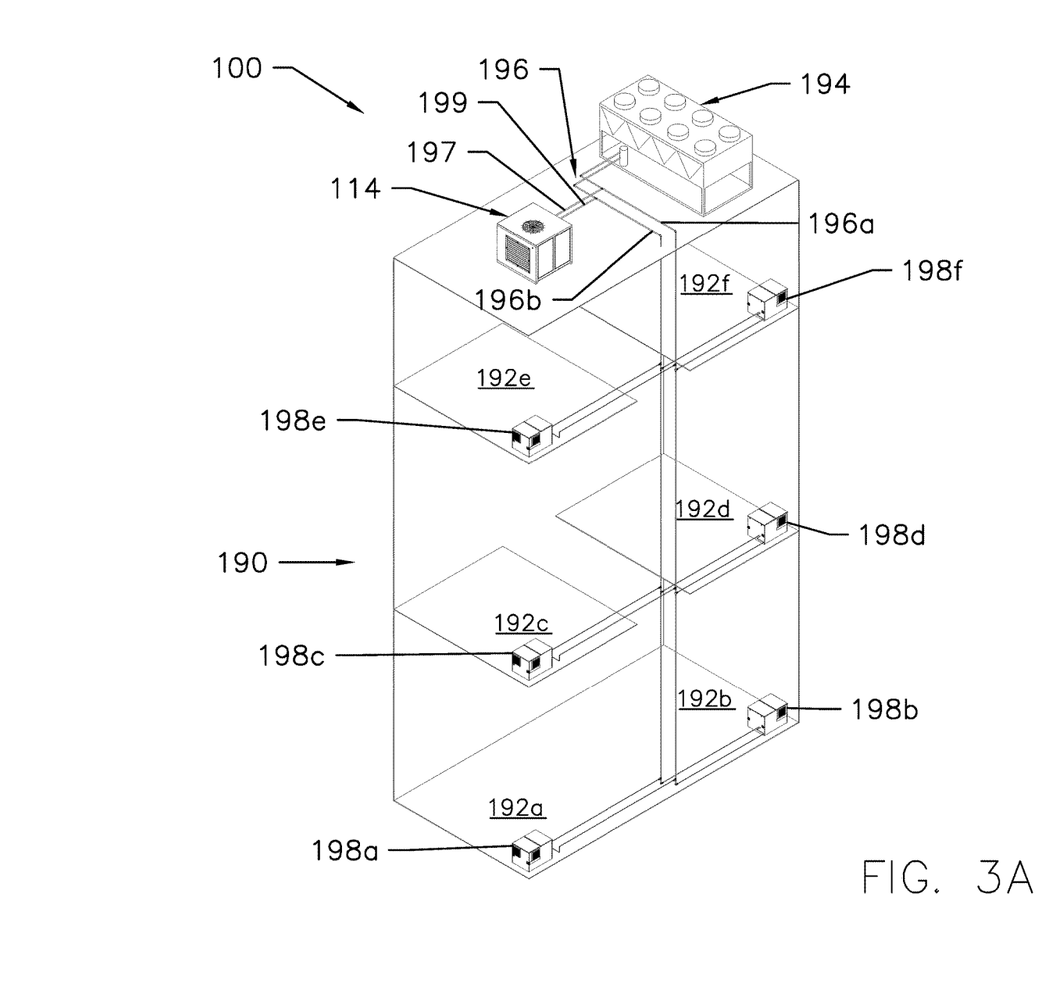
FIG. 3A is schematic, three-dimensional rendition illustrating a water-harvesting unit incorporated into a building's (potentially preexisting) air conditioning coolant-supply system according to another embodiment of the invention.
Figure 3B:
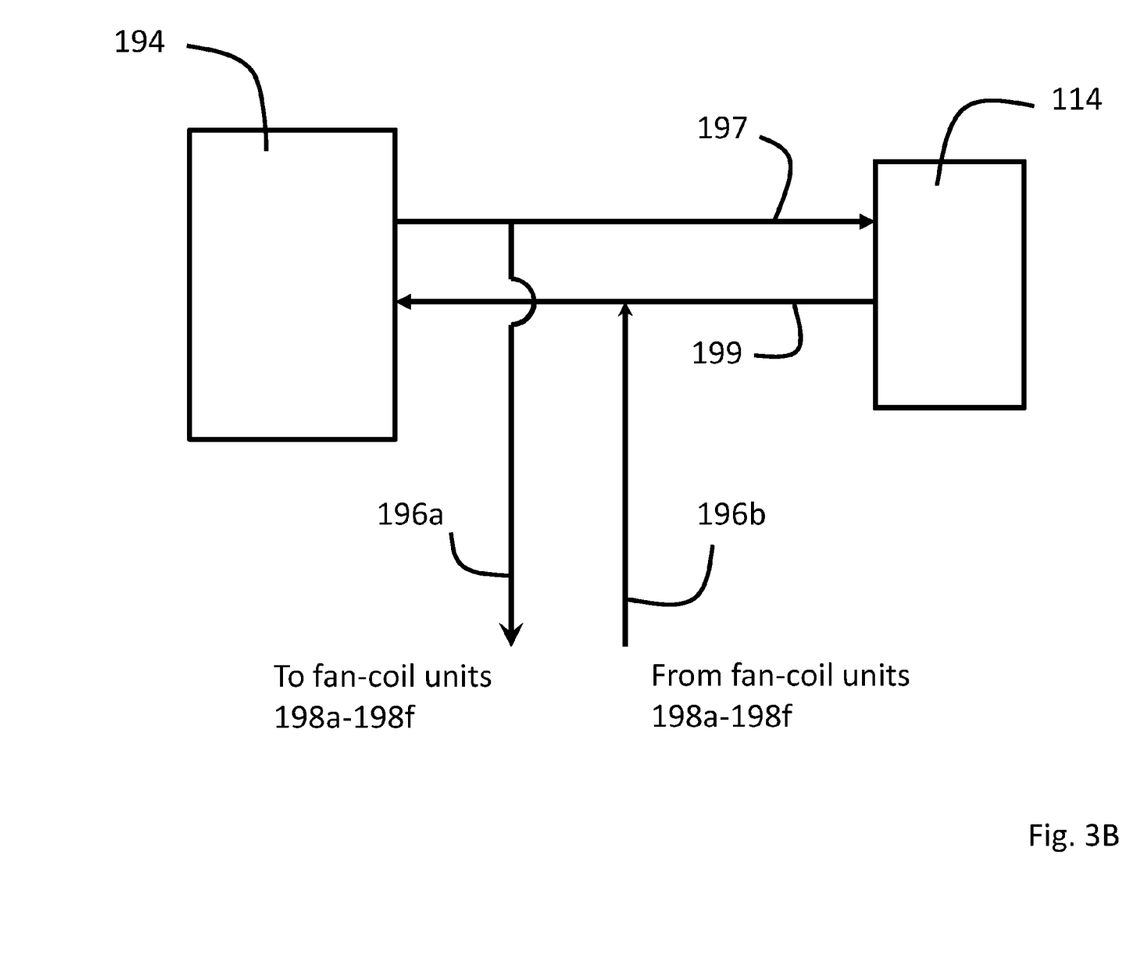
FIG. 3B is a schematic diagram illustrating a coolant-circulating system employed therein.
Figure 4:
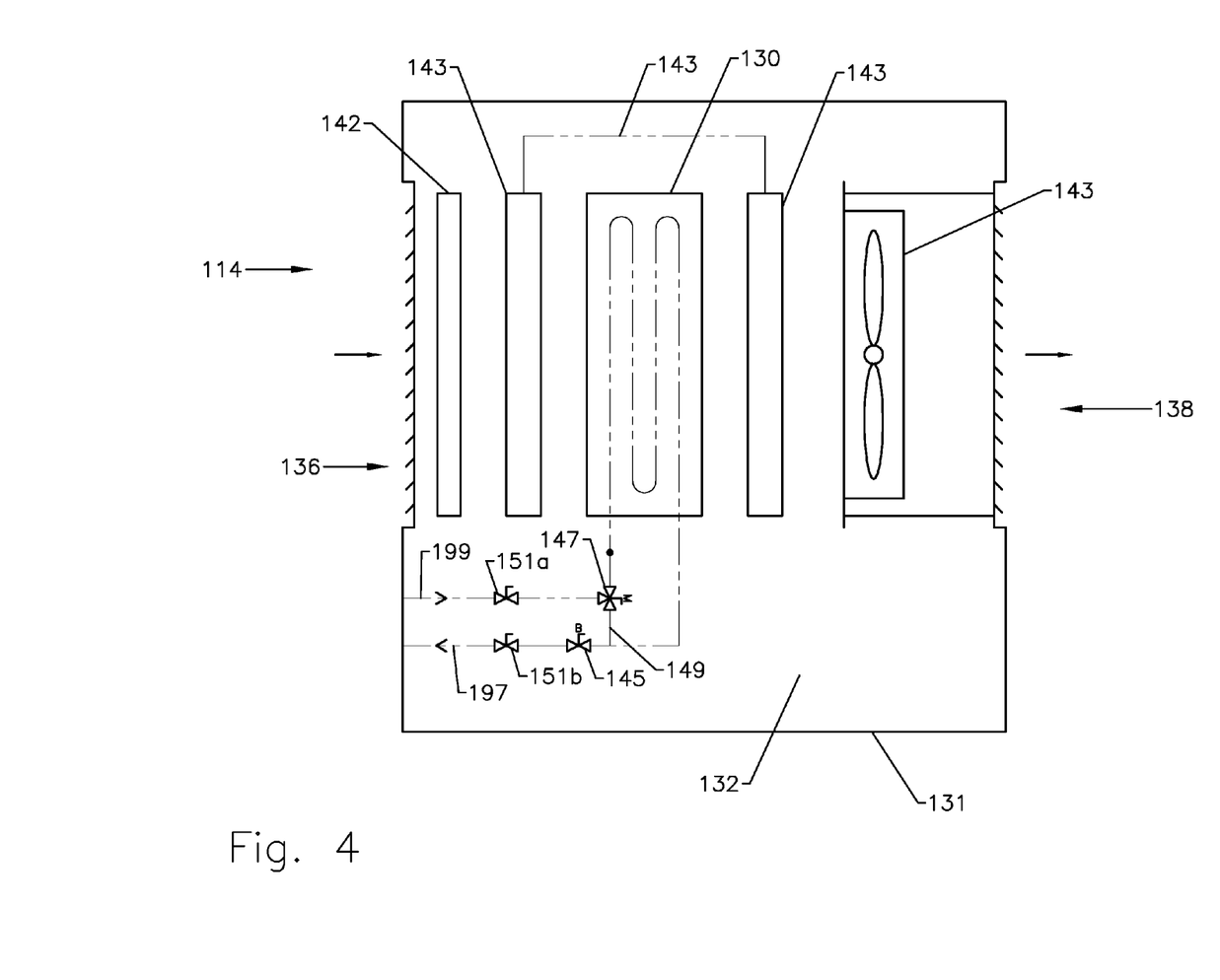
FIG. 4 is a schematic diagram of the water-harvesting unit illustrated in FIG. 3.

In yet another embodiment of the invention 100, which is illustrated in FIGS. 3A, 3B, and 4, a water-harvesting unit 114 can, advantageously, be connected relatively easily into the preexisting coolant supply system of a preexisting building 190. (The building could also be built with a water-harvesting system as part of the original construction if desired.) For example, the building 190 could be a large-scale commercial building such as an office building with offices or office suites, or a residential building with a number of apartment units, e.g. 192a-192f, located throughout the building.

An industrial chiller 194, suitably located on the roof or in the basement of the building 190, chills water—the coolant in this embodiment—to on the order of 40° F., and the water circulates throughout the building via a coolant-supply system 196, which includes supply pipes 196a and return pipes 196b as shown in FIG. 3B. Furthermore, fan-coil units 198a-198f are located in various circulatory branches throughout the building 190, e.g., in a parallel arrangement in each of the various offices or apartments 192a-192f, and receive and return water from/to the coolant-supply system 196. Each fan-coil unit 198a-198f has a cooling coil (not shown) through which chilled water circulates and a fan (not shown), which blows air to be cooled across the cooling coil. Water flowing through the cooling coil within a given fan-coil unit absorbs heat from the air, thereby warming slightly and cooling the air for the comfort of occupants within the office or apartment. In conventional buildings with no water-harvesting system connected to the air conditioning coolant-supply system, water returning to the chiller 194 may have been warmed to on the order of 50° F.

As further illustrated in FIG. 3A, a water-harvesting unit 114 is also provided—suitably on the roof of the building 190, where it can be connected into the building's air conditioning coolant-supply system 196 relatively easily even as a retrofit to a preexisting air conditioning system. Thus, chilled water from the industrial chiller 194 is supplied to the water-harvesting unit 114, as the operating coolant, via water-harvesting coolant supply line 197, and slightly warmed water is returned to the coolant-supply system 196 via water-harvesting coolant return line 199.

As shown in FIG. 4, the water-harvesting unit 114 includes a housing 131, which defines an air duct 132 therein. Variable-speed fan 134 moves air through the air duct 132, from inlet 136 to outlet 138. Suitably, air filter 142 is provided near the inlet 136 to remove dust, pollen, dirt, and other debris from the incoming air.

Evaporator (cooling coil) 130 is provided within the duct 132 so that the air flows across it. The evaporator 130 receives chilled water from the chiller 194 via water-harvesting coolant supply line 197; therefore, as air flows across the evaporator 130, it is cooled below the dew point so that moisture condenses on the surface of the evaporator 130, from which it can be collected and further treated, if desired, as described above. (The harvested water can be used for graywater-suitable uses such as flushing toilets; gardening; agriculture; washing floors, pavement, or windows; etc., or, if it is suitably treated, consumption.) Slightly warmed water, which has absorbed heat from the air flowing across the evaporator 130, returns to the coolant-supply system 196 via water-harvesting coolant return line 199.

As further illustrated in FIG. 4, a passive heat-exchange device, e.g., heat pipe system 143, is suitably provided "around" the evaporator 130 (i.e., with one portion upstream of the evaporator 130 and one portion downstream of the evaporator 130) to pre-cool the incoming air before it flows across the evaporator 130. In particular, because air that has flowed across the evaporator 130 will have been cooled somewhat, this air will be able to absorb heat, passed through the heatpipe 143, from the incoming air before the incoming air reaches the evaporator 130; the heat pipe system 143 effectuates such a transfer of heat from the air upstream of the evaporator 130 to the air downstream of the evaporator 130. Precooling the air before it traverses the evaporator 130 reduces the water-harvesting cooling load on the evaporator 130 and, hence, on the overall building's cooling supply system. (A similar heat-exchanger could be provided "around" the evaporator 30 in a refrigerant-based water-harvesting subsystem 14 as described above for the same reason.) Furthermore, depending on how warm the air downstream of the evaporator 130 becomes as it absorbs heat, it may be desirable to use it for cooling purposes, e.g., by venting it into the air conditioning system to augment the building's air condition system; cooling electrical systems; etc.

In a generally similar manner to that described above, cooling load on the overall building's coolant-supply system is monitored, but in this case by monitoring the temperature of the coolant (water) returning to the chiller 196. When the difference between the temperature of the water returning to the chiller 196 and the water exiting the chiller reaches a predetermined threshold, e.g., 15° F., the situation begins to arise in which air conditioning requirements and water-harvesting cooling load on the cooling system cannot be completely satisfied simultaneously. At that point, a controller—not illustrated but similar to that described above—begins to throttle back the speed of the variable-speed fan 134, thereby reducing air throughput; water-harvesting production; and hence cooling demand placed on the overall system by the water-harvesting unit 114. In other words, in the context of this embodiment 100, the air conditioning subsystem including the various fan-coil units 198a-198f throughout the building is the primary subsystem, and the water-harvesting subsystem including the water-harvesting unit 114 is the secondary subsystem.) Depending on air conditioning demands on the overall coolant system, the water-harvesting system could eventually reach a point where the variable-speed fan is shut off completely, thereby removing all cooling load placed on the overall coolant system by the water-harvesting unit 114. On the other hand, when air conditioning demands on the coolant system are low or non-existent, the water-harvesting unit 114 could be run at full speed to maximize water-harvesting production.

Finally with respect to the water-harvesting unit 114, the flow of water through the evaporator 130 is controlled by way of a balancing valve 145 within the coolant return line 197, which balancing valve maintains substantially constant flow of water through the evaporator 130 as flow within other parts of the system (e.g., through the various fan-coil units 198a-198f) varies. Additionally, an actuated three-way ball valve 147 is provided in the supply line 199. By shunting some of the supply water though the ball valve 147 to the return line 197, e.g., via shunt conduit 149, the temperature of the water circulating through the evaporator 130 can be maintained. Suitably, operation/position of the balancing valve 145 and the three-way ball valve 147 is controlled by the above-referenced controller. Finally, isolation valves 151a and 151b may be provided as desired, e.g., to facilitate installation or removal of the water-harvesting unit 114 into/from the coolant circulation system 196.

As noted above, connecting a water-harvesting unit 114 into the preexisting air conditioning system of an existing building 190—i.e., into the chilled-water coolant supply system 196 of the building 190—is relatively simple, and using the system to gather moisture from the atmosphere can substantially reduce demands for water the building's occupants place on local supplies. Essentially all that would be required is for the supply and return lines of the water-harvesting unit 114 to be connected into the supply and return lines of the building's coolant-supply system 196; additional water added to the system to fill the lines within the water-harvesting unit 114; and temperature sensors connected to the coolant-supply system's supply and return lines to measure the temperature of the water in the respective lines, which temperature information is provided to the overall system controller to regulate system performance as described above.

In the embodiment illustrated in FIGS. 3A, 3B, and 4, air is cooled in the individual dwelling spaces (e.g., apartments or offices) on a localized basis by means of fan-coil units distributed throughout the building. On the other hand, many buildings include a more centralized cooling system having an air-handling unit in which air to be cooled is blown across a central cooling coil, and a fan or blower system distributes the cooled air throughout the building through a series of ducts.

When this latter type of building-cooling system is employed, it can be exceptionally advantageous to arrange an atmospheric water-harvester such that at least some of the cooled-air exhaust generated by the atmospheric water-harvester is supplied to the building's cooling system, as a source of already-cooled air. This way, energy expended in cooling air to produce water is not simply "discarded" after the water-harvesting process. In fact, we have found that, quite remarkably and depending on specific operational configuration and setpoints, substantial volumes of water (e.g., 200 gallons per day for a building load of 100 tons cooling air conditioning cooling load, as one example we calculated) can be produced with an incremental cost in terms of energy consumption compared to strictly-air-conditioning systems of as little as 1%.

Figure 5:
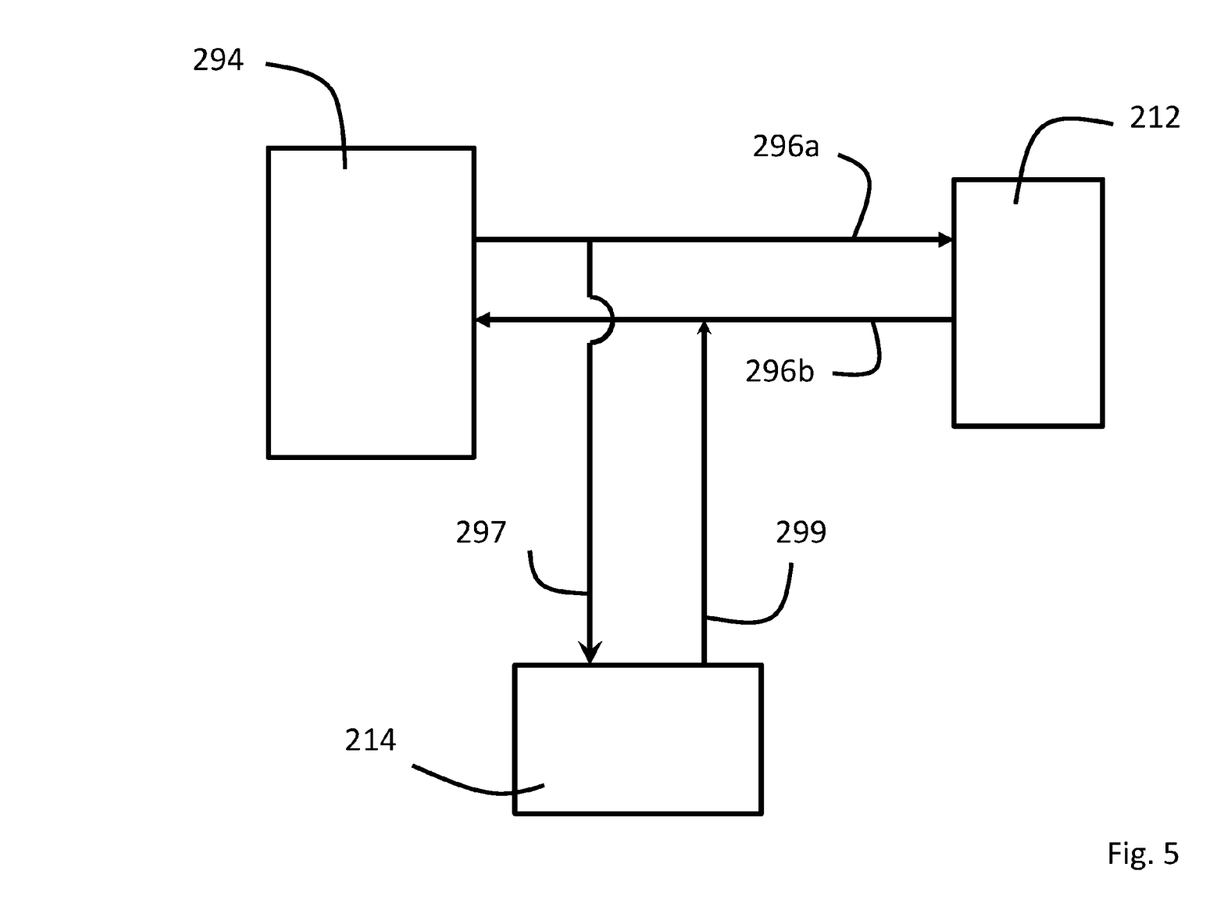
FIG. 5 is a schematic diagram illustrating a coolant-circulating system that may be employed in two further embodiments of an integrated air conditioning/water-harvesting system in accordance with the invention.
Figure 6A:
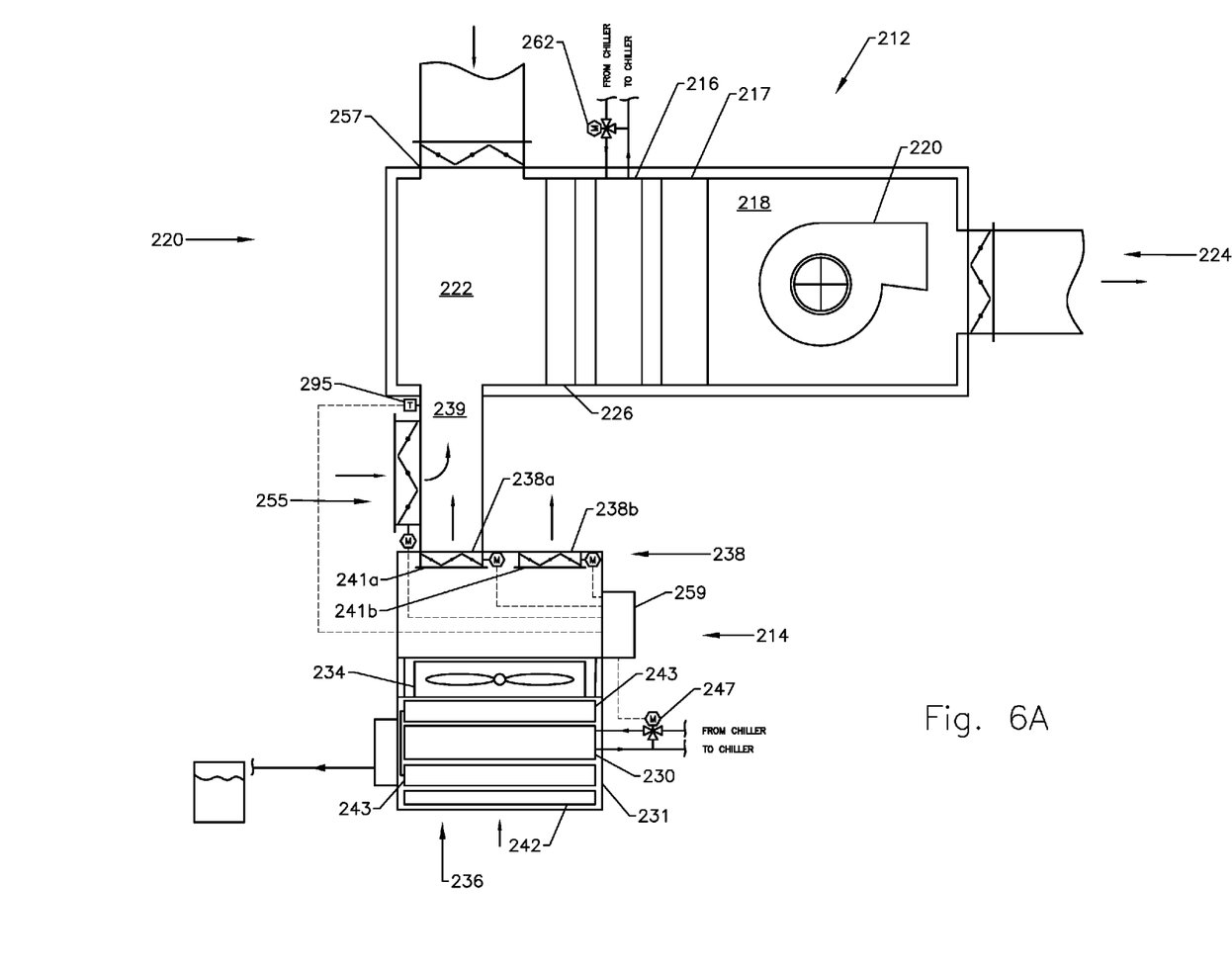
FIGS. 6A and 6B are schematic, overall system diagrams illustrating the two further embodiments of an integrated air conditioning/water-harvesting system in connection with which the coolant-circulating system of FIG. 5 may be employed.
Figure 6B:
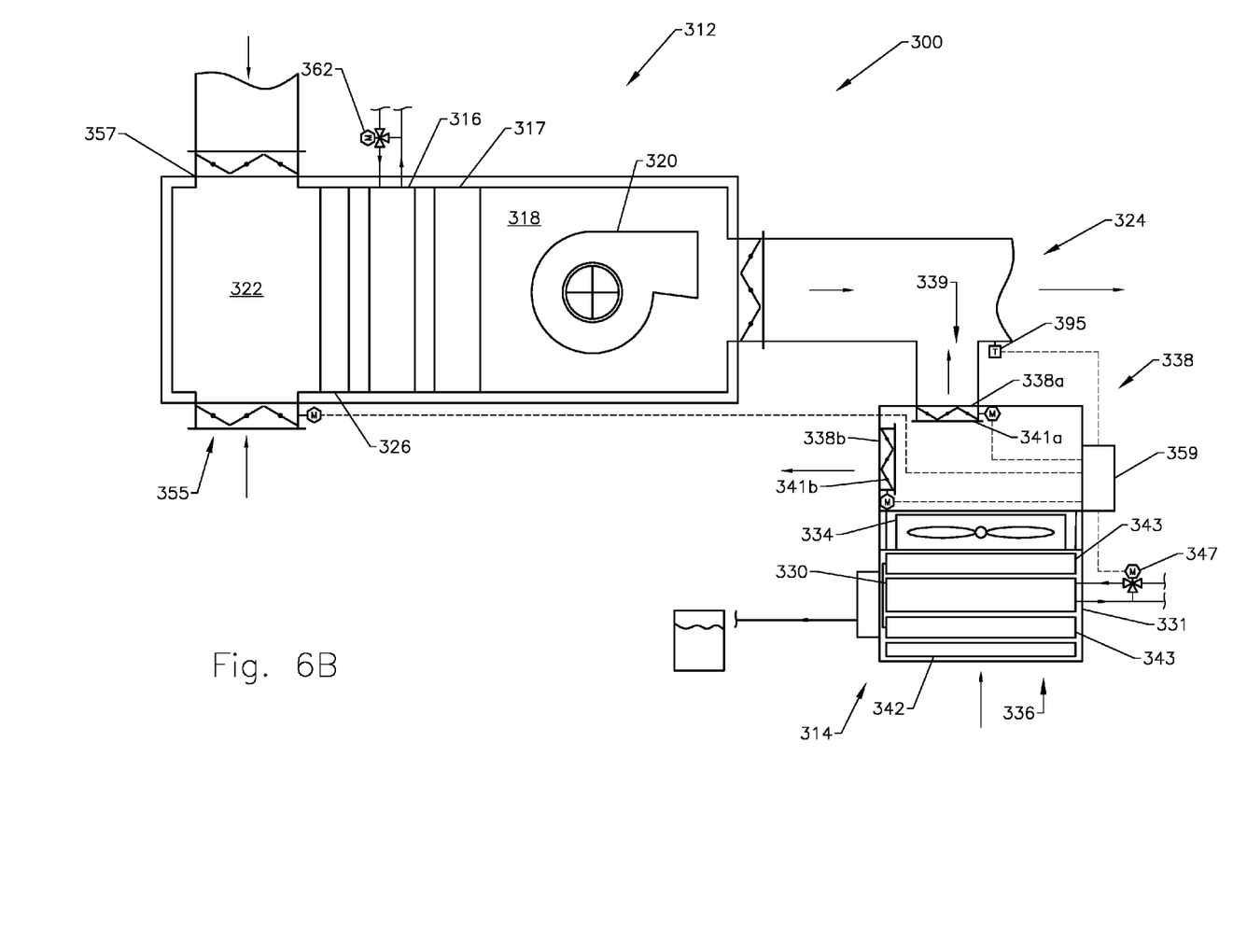

Two examples of such a system are illustrated in FIGS. 6A and 6B, where the difference between these two embodiments resides in where the atmospheric water-harvester exhaust air enters the air conditioning system. A coolant (i.e., water) circulation system that can be used with such an integrated air conditioning/water-harvesting system is first illustrated in FIG. 5.

In general, the coolant circulation system illustrated in FIG. 5 is similar to that illustrated in FIG. 1 to the extent a single mechanism or component processes the heat-removing cooling medium for use in both the atmospheric water-harvesting subsystem and the air conditioning subsystem, and to the extent there is a single, centralized location where air is cooled instead of multiple locations distributed throughout the building. Thus, as illustrated in FIG. 5, an industrial chiller 294, suitably located on the roof or in the basement of the building being served, chills water to on the order of 40° F., and the chilled water flows to a cooling coil in air-handling unit 212 via supply pipe 296a. As addressed further below, air is blown across the cooling cool in the air-handling unit 212, which chills the air to be used for air conditioning throughout the building. Water that has been warmed by absorbing heat from the air blowing across the cooling coil in the air-handling unit 212 then flows back to the chiller 294 via return pipe 296b.

Additionally, chilled water from the industrial chiller 294 flows to a cooling coil in atmospheric water-harvester 214 via supply pipe 297, which suitably may branch off from supply pipe 296a. As illustrated and described further below, air is blown across the cooling coil in the atmospheric water-harvester 214, which sufficiently chills the air to condense substantial amounts of water out of it. Chilled water that has been warmed by absorbing heat from the air blowing across the cooling coil in the atmospheric water-harvester 214 then flows back to the chiller 294 via return pipe 299, which suitably may connect with and feed water into return pipe 296b.

Thus, as shown in FIG. 6A, a further embodiment 200 of an integrated air conditioning/water-harvesting system in accordance with the invention, which suitably utilizes a water-based coolant system like that shown in FIG. 5, includes a commercial-scale air-handling unit 212 and an atmospheric water-harvester 214. In a generally conventional manner, the air-handling unit 212 includes a cooling coil 216 located within a duct 218, which cooling coil 216 receives chilled water from chiller 294 via supply line 296a (FIG. 5). A vent fan or other air-moving mechanism 220, which is also disposed in the duct 218, propels air along the duct 218—from a mixed-air plenum 222 to outlet ducting 224—and across the cooling coil 216, which cools the air flowing across it. (The air-handling unit 212 also may suitably include a heating cool 217, which can be electric, gas, hot water, or steam, and which warms the air passing across it when heating is needed, e.g., during winter months.) Cooled air exiting the duct 218 then flows through a series of ducts to various interior locations within the building being served by the air-handling unit 212. Suitably, the air-handling unit 212 includes an air filter 226, to remove undesirable air-borne particles such as dust, mold, allergens, etc., as well as a condensate pan (not illustrated) to collect any atmospheric moisture that may have condensed on and dripped off of the cooling coil 2

Generally similarly, the water-harvester 214 includes a housing 231, which defines an air duct extending through it. Variable-speed fan 234 propels air along the duct, from inlet 236 toward a downstream end 238. Significantly, and in contrast to the embodiments described previously, the downstream end 238 of the water-harvester 214 includes a duct port 238a, which selectively/controllably exhausts chilled air into connecting duct 239 leading to mixed-air plenum 222, and an air outlet 238b, which selectively/controllably exhausts chilled air to the environment. The duct port 238a and air outlet 238b suitably include dampers and/or variable-speed fans, schematically indicated at 241a and 241b, respectively, to regulate the amount of cooled air that exits the atmospheric water-harvester 214 through each. Suitably, air filter 242 is provided near the water-harvester inlet 236 to remove dust, pollen, dirt, and other debris from the incoming air.

Cooling coil 230 is provided within the water-harvester duct so that the air flows across it. The cooling coil 230 receives chilled water from the chiller 294 via supply line 297 (FIG. 5); therefore, as air flows across the cooling coil 230, it is cooled below the dew point so that moisture condenses on the surface of the cooling coil 230, from which it can be collected and further treated, if desired, via a suitable water-purification system. Slightly warmed water, which has absorbed heat from the air flowing across the cooling coil 230, returns to the chiller 296 via return line 299 (FIG. 5).

As further illustrated in FIG. 6A, a passive heat-exchange device, e.g., heat pipe system 243, is suitably provided "around" the cooling coil 230 (i.e., with one portion upstream of the cooling coil 230 and one portion downstream of the cooling coil 230) to pre-cool the incoming air before it flows across the cooling coil 230. Because air that has flowed across the cooling coil 230 will have been cooled somewhat, it will be able to absorb heat from the incoming air by the heat pipe 243 before the incoming air reaches the cooling coil 230; the heat pipe system 243 effectuates such a transfer of heat from the air upstream of the cooling coil 230 to the air downstream of the cooling coil 230. Precooling the air before it traverses the cooling coil 230 reduces the water-harvesting cooling load on the cooling coil 230 and, hence, on the overall building's cooling supply system.

As noted above, the air-cooling process in an atmospheric water-harvester is, generally speaking, similar to the air-cooling process used, e.g., in an air-handling unit for air conditioning, and even a conventional air conditioner or air-handling unit will produce some amount of water as atmospheric moisture condenses on the evaporator or the cooling coil. However, as will be understood by one of skill in the art (e.g., someone who works within the above-referenced atmospheric water-harvesting industry), an atmospheric water-harvester may be discerned from a conventional air conditioner or air-handling unit—at least to the extent a given device is being operated at particular setpoints, if not structurally—based on the significantly greater extent to which an atmospheric water-harvester cools the ambient air (on a volumetric-flow-rate-to-volumetric-flow-rate comparison basis), which is what allows an atmospheric water-harvester to produce significantly more water than a conventional air conditioner or air-handling unit (on a volumetric-flow-rate-to-volumetric-flow-rate comparison basis). Thus, while a conventional air conditioner or air-handling unit cools incoming air by just a few degrees before it is discharged downstream lest building occupants become too cold or uncomfortable due to the air being rendered excessively dry, an atmospheric water-harvester is structurally configured and/or operated at setpoints designed to cool the incoming air as much as possible.

As a result, for a given volumetric flow rate of air at a given set of ambient temperature and relative humidity conditions, an atmospheric water-harvester is generally able to extract at least about twice as much water from ambient air as a conventional air conditioner or air-handling unit. In fact, running an example comparison under ambient conditions of 80° F. at 60% relative humidity (benchmark conditions based on which most manufacturers within the industry market their atmospheric water-harvesters), we were able to obtain three times as much water with an atmospheric water-harvester than with a conventional air-handling unit at the same volumetric flow-rate of air through the devices. This is particularly remarkable considering that water from the same source, and hence at the same temperature, is used as the air-cooling medium in both devices.

To achieve such increases in water production, atmospheric water-harvester cooling coils are suitably designed to achieve off-coil air temperatures that are at least 15° F. cooler than would be produced by a typical air conditioning or air-handling unit cooling coil. In other words, an atmospheric water-harvester cooling coil that uses water as the cooling medium (as in the embodiments illustrated in FIGS. 3A, 3B, 4, 5, 6A, and 6B) is suitably designed to chill air flowing across it to an off-coil air temperature that is within about 5° F. to about 8° F. of the temperature of the water entering the cooling coil, whereas a conventional air-handling unit cooling coil is typically designed to achieve a reduction in air temperature that only brings the off-coil temperature of air flowing across the cooling coil to within about 15° F. to about 20° F. of the temperature of the water entering the cooling coil.

Additionally, atmospheric water-harvester cooling coils are suitably designed for a face velocity of less than 300 feet per minute (to prevent the incoming air from blowing condensing moisture off of the cooling coil and downstream), whereas air-handling unit cooling coils are typically designed for face velocity values up to 600 feet per minute. Thus, for a given volumetric throughput of air for which it is being designed, an atmospheric water-harvester will have a cooling coil with a larger cross-sectional area (perpendicular to the direction of flow) than an air-handling unit will have (by a factor of about 2). Furthermore, atmospheric water-harvester cooling coils are almost always "supported" by energy-recovery devices (such as heat pipes 143, 243 in the above-described embodiments), which are used to increase water production. Atmospheric moisture-harvester cooling coils are typically fabricated from select materials such as pure copper and possibly stainless steel, with or without coatings, to control quality of the end product; they are encased on only three sides to promote fluid collection and reduce the amount of time condensed water spends in contact with the coil materials; and they are generally designed to allow less leakage of air, which could potentially contaminate water produced thereby.

In addition to these structural differences used to effect enhanced water-production with an atmospheric water-harvester, coolant flow through the evaporator or cooling coil of an atmospheric water harvester is also suitably controlled to achieve the degree of cooling necessary to achieve such results. Thus, as indicated above, the atmospheric water-harvester 14 shown in FIG. 1, which utilizes a refrigerant-based evaporator, includes valves 60 and 64 as well as pressure and temperature sensors 78 to monitor and regulate cooling performance of the evaporator 30; and the atmospheric water-harvester 114 shown in FIG. 4, which utilizes a water-based cooling coil, includes balancing valve 145 and actuated three-way ball valve 147 to regulate the temperature of water circulating through the evaporator 130. Similarly, the atmospheric water-harvester 214 illustrated in FIG. 6A includes actuated three-way valve 247, which regulates the amount of water flowing into the cooling coil 230 as well as possible shunting of water between the water inlet and return lines 297, 299 (FIG. 5), and air temperature sensor 295 to monitor and regulate performance of the water-harvester 214. (The air-handling unit 212 similarly may include actuated three-way valve 262 to regulate the amount of water flowing into its cooling coil 216 as well as possible shunting of water between the water inlet and return lines 296a, 296b (FIG. 5), thereby to regulate performance of the air-handling unit 212.)

As indicated above, it can be exceptionally advantageous to arrange an atmospheric water-harvester such that at least some of the cooled-air exhaust generated by the atmospheric water-harvester is supplied to the building's cooling system, as a source of already-cooled air, when a centralized air conditioning system (e.g., one using an air-handling unit) is employed. To that end, as further indicated above, the water-harvester 214 illustrated in FIG. 6A is arranged to provide at least some of its cooled-air exhaust to a location upstream of the air-handling unit's cooling coil 216. For example, as more specifically illustrated in FIG. 6A, the atmospheric water-harvester 214 is arranged to provide at least some of its cooled exhaust air to mixed-air plenum 222, in which the water-harvester exhaust air—if any is used—is mixed with fresh air that is brought into the system via fresh-air inlet 255 and return air from the building, which enters the plenum 222 via return port 257.

Furthermore, the extent to which it is desired to feed exhaust air from the atmospheric water-harvester 214 into the building's cooling system 212 will vary depending on conditions such as ambient temperature and relative humidity. Therefore, the relative amounts of exhaust air that exits the atmospheric water-harvester 214 through the duct port 238a, which provides chilled air to the mixed-air plenum 222, and air outlet 238b, which vents chilled air to the ambient environment, can be controlled. (For maximum system flexibility, the duct port 238a and the air outlet 238b are suitably independently controllable, with the amount of air that can pass through each ranging from zero (fully closed) to the entirety of flow required by the system with the other exit means closed (fully open).) In particular, the atmospheric water-harvester control system 259 measures the temperature of the combined fresh air and water-harvester exhaust air just before it enters the plenum 222 via temperature sensor 295. If this temperature is too low, i.e., below a predetermined threshold that may vary with relative humidity, the control system will increase the temperature of that combined air by reducing the amount of air exiting the atmospheric water-harvester through duct port 238a; the amount of fresh air entering the system via fresh-air inlet 255; and/or by temporarily reducing the cooling capability of the cooling coil 231 by means of the valve 247 (which makes the water-harvester exhaust air less cold). Of these three approaches to temperature-control, the degree to which one or another is used may vary depending on time of day, ambient temperature, presently primary function of the combined system (i.e., cooling or water production), etc.

Finally, an alternative embodiment 300 of an integrated air conditioning/water-harvesting system in accordance with the invention, which is also configured such that at least some of the cooled-air exhaust generated by the atmospheric water-harvester is supplied to the building's cooling system as a source of already-cooled air, is illustrated in FIG. 6B. The primary difference between the embodiments shown in FIGS. 6A and 6B resides in where the atmospheric water-harvester exhaust air enters the air conditioning system. Thus, in the embodiment 300 shown in FIG. 6B, atmospheric water-harvester exhaust air is supplied to the building cooling system (if any is used) at entry point 339, where it mixes with air that has already been cooled by the air-handling unit 312. Additionally, temperature sensor 395 measures the temperature of the combined water-harvester exhaust air and air-handling-unit-cooled air instead of combined water-harvester exhaust air and incoming ambient air, and temperature-control schemes are adjusted accordingly. Otherwise, the two embodiments are essentially the same, and corresponding components are labeled with corresponding reference numerals that have been incremented by 100 but are not separately described.

The foregoing disclosure is only intended to be exemplary. Departures from and modifications to the disclosed embodiments may occur to those having skill in the art. The scope of the invention is set forth in the following claims.

We claim:

1. An integrated air conditioning and water-harvesting system, comprising:
    an air conditioning subsystem comprising an air conditioning evaporator and an air conditioning blower which drives air across the air conditioning evaporator to be cooled;
    a water-harvesting subsystem comprising a water-harvesting evaporator and a water-harvesting blower which drives air across the water-harvesting evaporator to be cooled to a point sufficient to condense atmospheric moisture out of the air flowing across the water-harvesting evaporator, wherein the water-harvesting subsystem is configured to cool atmospheric air to a lower temperature than the air conditioning subsystem is configured to cool the atmospheric air, whereby the water-harvesting subsystem causes more moisture to condense out of the atmospheric air than the air conditioning subsystem does; and
    a unitary coolant supply system that supplies operating coolant to the evaporators in both the air conditioning subsystem and the water-harvesting subsystem;
    wherein one of the two subsystems is a primary subsystem and the other of the two subsystems is a secondary subsystem; and
    wherein the system further comprises a controller that is configured 1) to assess whether the primary system is able to meet air-cooling load placed on the evaporator thereof; and 2) to retard output of the secondary system as the air-cooling-load-carrying capacity of the primary system's evaporator is reached and/or exceeded.

2. The system of claim 1, wherein the coolant supply system includes gas/liquid-phase refrigerant as the operating coolant and comprises a refrigerant compressor and a refrigerant condenser that respectively compress and condense the refrigerant, which is supplied to both the air conditioning and the water-harvesting evaporators.

3. The system of claim 2, further comprising a refrigerant temperature sensor and a refrigerant pressure sensor, wherein the controller is configured to assess whether the primary system is able to meet cooling load placed on the evaporator thereof by means of temperature and pressure of refrigerant leaving the primary subsystem's evaporator.

4. The system of claim 3, wherein the controller is configured to calculate the superheat of said refrigerant leaving the primary subsystem's evaporator and to begin retarding output of the secondary subsystem when the calculated superheat reaches a predetermined threshold.

5. The system of claim 1, wherein the system and the controller are configured such that the air conditioning subsystem is the primary subsystem.

6. The system of claim 1, wherein the system and the controller are configured such that the water-harvesting subsystem is the primary subsystem.

7. The system of claim 1, wherein the system and the controller are configured such that which of the two subsystems is the primary subsystem can be toggled between the air conditioning subsystem and the water-harvesting subsystem.

8. The system of claim 1, wherein the coolant supply system includes chilled water as the operating coolant and comprises a chiller that chills the water, which is supplied to both the air conditioning and the water-harvesting evaporators.

9. The system of claim 8, wherein the air conditioning subsystem comprises a plurality of fan-coil units distributed throughout a building, wherein each fan-coil unit includes an evaporator through which water circulates and a fan which blows air across the fan-coil unit.

10. The system of claim 9, wherein the air conditioning system is the primary subsystem.

11. The system of claim 10, wherein the controller is configured to assess whether the air conditioning system is able to meet cooling load placed on the evaporators thereof by means of temperature of coolant water within the coolant supply system.

12. The system of claim 11 wherein the controller is configured to assess whether the air conditioning system is able to meet cooling load placed on the evaporators thereof by means of temperature of coolant water returning to the chiller.

13. The system of claim 12, wherein the controller is configured to calculate a difference in temperature between water leaving the chiller and water returning to the chiller and to begin retarding output of the water-harvesting subsystem when the calculated difference reaches a predetermined threshold.

* * * * *